United States Patent Office 2,867,611
Patented Jan. 6, 1959

2,867,611

METHOD FOR THE PREPARATION OF POLYSULFONYL CHLORIDES OF STYRENE RESINS

Arthur S. Teot, Midland, Mich., assignor to The Dow Chemical Company, Midland, Mich., a corporation of Delaware No Drawing. Application January 24, 1955
Serial No. 483,801

4 Claims. (Cl. 260—79.3)

This invention pertains to alkenylaromatic resins containing sulfonyl chloride groups and to a method for the preparation thereof. It particularly concerns a method for converting alkenylaromatic resin sulfonic acids to the corresponding sulfonyl chlorides.

Alkenylaromatic resins containing sulfonyl chloride groups have been made by reaction of alkenylaromatic resins with chlorosulfonic acid. However, such reaction also causes the formation of sulfonic acid groups and the resulting products contain only a small proportion of sulfonyl chloride groups relative to the polymer structure and/or only a small proportion of sulfonyl chloride groups relative to sulfonic acid groups.

An object of this invention is to provide polysulfonyl chlorides of alkenylaromatic resins, especially such as contain a considerable proportion of sulfonyl chloride groups relative to the polymer structure and relative to sulfonic acid groups.

A particular object is to provide such polysulfonyl chlorides of styrene-type polymeric materials.

Another object is to provide a method for making polysulfonyl chlorides from alkenylaromatic resin sulfonic acids.

Other objects and advantages are evident in the following description of the invention.

The objects of this invention are attained by reacting resinous alkenylaromatic polysulfonic acids, such as polystyrene sulfonic acid, with thionyl chloride whereby there are formed the corresponding polymeric alkenylaromatic polysulfonyl chlorides in which at least 70 percent of the sulfonyl groups are sulfonyl chloride groups.

The reaction can be represented by the equation:

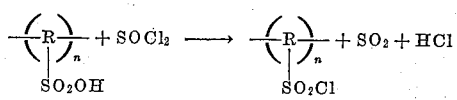

wherein the symbol $-(R)_n-$ represents an alkenylaromatic resin which contains sulfonyl groups as substituents, principally on aromatic nuclei therein, only one sulfonyl group being shown for purpose of illustration. In the resin sulfonic acids these sulfonyl groups are sulfonic acid groups, at least 70, and preferably 90 or more, percent of which are converted into sulfonyl chloride groups by reaction with thionyl chloride to form resin sulfonyl chlorides in the present method.

Suitable polymeric alkenylaromatic polysulfonic acids and methods for their preparation are already known. The polysulfonic acids may be prepared by polymerization of polymerizable materials comprising monomeric alkenylaromatic sulfonic acids such as vinylbenzene sulfonic acid or by sulfonation of polymers of alkenylaromatic compounds. The basic polymer structures of suitable resin sulfonic acids are ones containing at least 60 percent by weight of a monoalkenylaromatic compound chemically combined therein. Examples of such monoalkenylaromatic compounds include styrene, alpha-alkylstyrenes such as alpha-methylstyrene, ar-alkylstyrenes such as ar-methylstyrene (ar-vinyltoluene), ar-dimethylstyrene (ar-vinylxylene), alpha, ar-dimethylstyrene (ar-methylisopropenylbenzene), and ar-ethylstyrene, halostyrenes such as chlorostyrene and dichlorostyrene, alkoxystyrenes such as methoxystyrene, vinylnaphthalene and other aromatic compounds containing an alkenyl group attached to a carbon atom of an aromatic nucleus. The resin sulfonate polymer structures can consist of one or more of these alkenylaromatic compounds or can contain, chemically combined therein, not more than 40 percent by weight of another copolymerizable monovinylidene compound such as acrylic acid esters, methacrylic acid esters, acrylonitrile, methacrylonitrile, acrylamides, maleic anhydride, maleic esters, vinyl esters, unsaturated ethers, unsaturated ketones, vinyl halides, vinylidene halides and olefins such as ethylene and isobutylene. There can also be used polymer structures containing sulfur dioxide. The polymer structures can also contain small proportions of polyalkenyl compounds such as divinylbenzene, butadiene, glycol acrylates and the like, provided that the products prior to sulfonation are not so highly crosslinked as to be insoluble in usual polymer solvents such as toluene, methyl ethyl ketone and dioxane. If the molecular weight of the starting polymer is low, a considerable amount of crosslinking during sulfonation, e. g., formation of sulfone linkages, can be allowed, whereas high molecular weight polymer starting materials allow substantially no crosslinking during sulfonation to obtain starting materials suitable for the present process. The molecular weight of the base polymer resin is preferably not in excess of about 700,000 on a weight average basis.

For use in the present process, the starting resin sulfonic acid can be any one of the above-described resins containing sulfonic acid groups, including those in which the proportion of sulfonic acid groups relative to the polymer structure is low, e. g., less than 0.4 sulfonic acid group per molecule of monomeric material chemically combined in the polymer. The method is especially advantageous for application to those resin sulfonic acids that contain at least 0.4 sulfonic acid group per molecule of monomeric material chemically combined therein, including the water-soluble resin sulfonic acids that usually contain at least 0.6, e. g. 0.6 to 1, sulfonic acid group per molecule of monomeric material chemically combined therein.

The present method is practiced by reacting together a polymeric alkenylaromatic polysulfonic acid of the kind just described and thionyl chloride by contacting the reactants at a reaction temperature, in the presence of an inert diluent liquid as a medium for the reaction, and conducting the reaction in such a manner and under such conditions that at least 70, preferably 90 or more, percent of the sulfonic acid groups are converted to sulfonyl chloride groups.

The reaction between the resin sulfonic acid and thionyl chloride is carried out in the presence of an inert liquid diluent, i. e., a liquid that is chemically inert under the reaction conditions. Especially suitable for use as reaction media are the chlorinated aliphatic hydrocarbon liquids, e. g., methylene chloride, carbon tetrachloride and perchloroethylene. While the thionyl chloride is soluble in such inert liquid diluents, neither the resin sulfonic acid starting materials nor the resin sulfonyl chloride reaction products are soluble unless the proportion of sulfonyl groups relative to the polymer is very low. The inert diluent is employed in such proportions as to provide an easily stirred dispersion during the reaction, usually in amounts corresponding to about 80 or more, preferably from 85 to 99, percent by weight of liquid diluent based on the whole reaction mixture. Consequently, the reaction mixture usually contains up to about 20, preferably from 1 to 15, percent by weight of solid resin material. In practice of the invention, there is usually prepared a dispersion of the solid resin sulfonic acid starting material in a suitable inert diluent liquid, such as one of the chlorinated aliphatic hydrocarbon liquids, and thionyl chloride is added to that dispersion.

At least one molecular proportion of thionyl chloride is employed for each chemical equivalent of sulfonic acid, i. e., for each —SO₃H group, in the resin sulfonic acid starting material, and usually 1.5 or more molecular proportions of thionyl chloride on the same basis are preferred since an amount of thionyl chloride in excess of that theoretically required gives a more rapid and complete reaction.

The reaction mixture is usually held at a reaction temperature, preferably between room temperature, e. g., 25° C., and about 120° C., with stirring until the reaction is substantially complete. The reaction time is usually inverse to the temperature, e. g., from about 4 hours at the higher of these temperatures to about 24 hours at the lower temperatures. The course of reaction can be followed by observing the rate and extent of evolution of sulfur dioxide and hydrogen chloride, and the cessation of gas evolution can be taken as indicative of the end of the reaction under the instant conditions.

The afore-mentioned chlorinated aliphatic hydrocarbon liquids (preferred as media for reaction of resin sulfonic acids with thionyl chloride) are also commonly used as media for the preparation of the resin sulfonic acids by by sulfonation of suitable polymer starting materials. Accordingly, it is convenient to prepare a resin sulfonic acid by reaction of a suitable polymer starting material such as polystyrene with a suitable sulfonation agent such as sulfur trioxide in the presence of a chlorinated aliphatic hydrocarbon liquid diluent as medium for the sulfonation reaction in the known manner, and to employ the resulting reaction product directly in the present method for reaction of the resin sulfonic acid with thionyl chloride. A part of the diluent medium employed during the sulfonation reaction can be removed, e. g., by filtration or by distillation, from the sulfonation reaction product mixture, or a further amount of diluent liquid can be added thereto, to change the proportion of the solid resin sulfonic acid in the dispersion before adding the thionyl chloride reactant. Alternatively, the diluent employed during the sulfonation reaction can be replaced by a different liquid diluent before commencing the reaction with thionyl chloride.

It is advantageous that a freshly-prepared resin sulfonic acid be employed in the present process. When the resin sulfonic acid is prepared in the known manner by reaction of a sulfonating agent on a suitable polymer starting material while the reactants are dissolved or dispersed in a liquid diluent such as a chlorinated aliphatic hydrocarbon liquid, the resulting resin sulfonic acid, even though insoluble and precipitated from the sulfonation reaction mixture as particles or granules, is swollen with the liquid diluent. Such swollen particles of resin sulfonic acid are readily reactive with thionyl chloride. If the resin sulfonic acid is allowed to dry, i. e. if the swelling agent is removed from the swollen particles, the resin sulfonic acid particles appear to shrink. Such dried resin sulfonic acid particles or granules, even if redispersed in an otherwise suitable liquid diluent medium, are less readily reactive with the thionyl chloride.

By reaction of thionyl chloride on a dispersion of a resin sulfonic acid in an inert liquid diluent, there results a dispersion of a resin sulfonyl chloride in a liquid medium. After the reaction is ended, the dispersion can be separated in usual manner, such as by distillation, filtration, centrifugation or decantation, and the solid product can be washed with an inert non-solvent liquid and/or with water and dried.

The resulting resin polysulfonyl chlorides have substantially the same basic molecular structure as the resin sulfonic acids from which they were derived by conversion of sulfonic acid groups to sulfonyl chloride groups. The polymeric molecular structure is one having at least 60 percent by weight of at least one monoalkenylaromatic compound chemically combined therein and having substituted thereon sulfonyl groups, of which at least 70, and usually 90 or more, percent are sulfonyl chloride groups and not more than 30 percent are sulfonic acid groups. There can readily be obtained resin sulfonyl chlorides in which there is an average of 0.4 or more, e. g. from 0.4 to 1, sulfonyl group per molecule of monomeric material chemically combined in the polymer structure, at least 70 percent of the sulfonyl groups being sulfonyl chloride groups and not more than 30 percent of the sulfonyl groups being sulfonic acid groups.

The resin polysulfonyl chloride products are insoluble in water. Those which have at least 0.4 sulfonyl group per molecule of monomeric material chemically combined therein are also insoluble in most organic liquids. Some of the resin sulfonyl chlorides are soluble in tetrahydrofuran, dimethylformamide and/or nitrobenzene, particularly the resin sulfonyl chlorides prepared from non-crosslinked resin sulfonic acids of relatively low molecular weight. When the starting polymer structure has a high molecular weight, or when the resin sulfonic acid has an appreciable degree of cross linkages, e. g. sulfone linkages, the resulting resin sulfonyl chlorides are less soluble, or are insoluble, in tetrahydrofuran, dimethylformamide, and/or nitrobenzene.

The resin sulfonyl chlorides are valuable intermediates for use in the preparation of polymer resin products having as substituent groups derivatives of the sulfonic acid group such as sulfonic acid ester groups and sulfonamide groups. For this purpose the resin sulfonyl chlorides can be further reacted with alcohols, alkali alkoxides or primary or secondary amines or ammonia.

It might be mentioned that, whereas simple organic sulfonic acids such as benzenesulfonic acid can be readily converted to the corresponding organic sulfonyl chlorides by reaction with phosphorus chlorides such as phosphorus pentachloride, such reagents have not been satisfactory for conversion of resin polysulfonic acids to resin polysulfonyl chlorides.

The following examples illustrate how the invention has been practiced, but are not to be construed as limiting its scope.

*Example 1*

A solution containing 3 percent by weight polystyrene in cabron tetrachloride and a solution containing 3 percent by weight sulfur trioxide in carbon tetrachloride were fed concurrently to a mixing and reaction zone with vigorous agitation and at room temperature in relative proportions of one mole of sulfur trioxide per mole of styrene in the polymer. The polystyrene was one having a weight average molecular weight of about 30,000. The reaction produced a slurry of highly swollen granules suspended in a liquid medium. The solids content of the slurry, i. e., the weight of the solid polystyrene sulfonic acid on a dry, solvent-free basis relative to 100 parts of the whole slurry, was about 3 percent by weight. A sample portion of the granules, separated from the liquid and dried, was soluble in water to form a clear solution.

A 300-gram portion of the slurry of freshly made polystyrene sulfonic acid in carbon tetrachloride was admixed with 7 grams of thionyl chloride in a vessel under reflux and the mixture was heated at reflux (temperature about 80° C.) for six hours. The resulting slurry of swollen granules in carbon tetrachloride was filtered and the solid cake was dried free of carbon tetrachloride, washed thoroughly with cold water and again dried. Elemental analysis of the dry product was as follows, in percent by weight.

| | Percent |
|---|---|
| C | 45.70 |
| H | 3.58 |
| Cl | 16.45 |
| S | 16.32 |

These analyses indicate that about 91 percent of the sulfonic acid (—SO$_3$H) groups in the polystyrene sulfonate were converted to sulfonyl chloride (—SO$_2$Cl) groups by the action of thionyl chloride and that there is an average of about 0.97 sulfonyl chloride group per styrene unit in the polysulfonyl chloride product.

*Example 2*

To a vigorously stirred 5 percent by weight solution of a polystyrene in methylene chloride at a temperature of 0° was added a 5 percent by weight solution of sulfur trioxide in methylene chloride in amount corresponding to one mole of sulfur trioxide per mole of styrene chemically combined in the polymer. The starting polymer had a weight average molecular weight of about 44,000. The temperature of the reaction mixture rose to about 14° C. during the addition of the sulfur trioxide solution. A sample portion of the polystyrene sulfonate was tested and found to be soluble in water to form a clear solution.

A 300-gram portion of the freshly prepared slurry of polystyrene sulfonic acid in methylene chloride was admixed with 21 grams of thionyl chloride and the resulting mixture was refluxed at a temperature of 40° C. for 5 hours. It was noticed that the swollen granules in the methylene chloride slurry tended to be slightly sticky or gummy. Such a property was not seen in resins made with carbon tetrachloride as a diluent reaction medium.

The slurry was filtered and the cake was allowed to dry and was then washed thoroughly with cold water and was dried at about 60° C. Analysis of a portion of the product is as follows, in percent by weight.

| | Percent |
|---|---|
| C | 46.1 |
| H | 3.65 |
| Cl | 16.34 |
| S | 15.98 |

These analyses indicate that about 92 percent of the sulfonic acid groups in the polystyrene sulfonic acid were converted to sulfonyl chloride groups by action of thionyl chloride and that there is an average of about 0.96 sulfonyl chloride group per styrene unit in the polysulfonyl chloride product.

*Example 3*

A polymer of ar-vinyltoluene (a solution of a portion of which in nine times its weight of toluene had a viscosity of 22.9 centipoises at 25° C.) was dissolved in carbon tetrachloride and was sulfonated with a molecular equivalent of sulfur trioxide to form a slurry of polymerized vinyltoluene sulfonic acid in carbon tetrachloride having a solids content of about 3 percent by weight. A sample portion of the polymer sulfonic acid was dissolved in water and at 2 percent by weight concentration formed a solution having a viscosity of 60 centipoises at 25° C.

A 6086-gram portion of the freshly prepared 3 percent by weight slurry of sulfonated vinyltoluene polymer in carbon tetrachloride was admixed with 214.2 grams of thionyl chloride and the resulting mixture was refluxed (at about 80° C.) for 23.5 hours.

The resulting slurry was filtered and the cake was allowed to dry free of carbon tetrachloride and was then thoroughly washed with water and dried. The dried polymeric vinyltoluene sulfonyl chloride was insoluble in water, soluble in tetrahydrofuran and had the following analysis, in percent by weight.

| | Percent |
|---|---|
| Sulfur | 15.17 |
| Chlorine | 15.87 |

These analyses correspond to a conversion of about 94.5 percent of the sulfonic acid groups to sulfonyl chloride groups.

*Example 4*

A polymer of ar-vinyltoluene (a solution of a portion of which in nine times its weight of toluene had a viscosity of 196.5 centipoises at 25° C.) was sulfonated with a molecular proportion of sulfur trioxide while dissolved in carbon tetrachloride to form a 1 percent by weight slurry of polymeric vinyltoluene sulfonic acid in carbon tetrachloride. A 0.5 percent by weight solution in water of a sample portion of the polymer sulfonate had a viscosity at 25° C. of 136 centipoises.

To a 2076-gram portion of the 1 percent by weight slurry of sulfonated vinyltoluene polymer in carbon tetrachloride was added 23.8 grams of thionyl chloride and the mixture was boiled under reflux for 23 hours.

The resulting slurry was filtered and the cake was allowed to dry free of carbon tetrachloride. The cake was then washed thoroughly with water and dried. The polymeric vinyltoluene sulfonyl chloride was insoluble in water and insoluble in both tetrahydrofuran and in dimethylformamide. The elemental analysis, in percent by weight, is as follows:

| | Percent |
|---|---|
| Sulfur | 14.6 |
| Chlorine | 15.19 |

These analyses correspond to a conversion of about 94 percent of the sulfonic acid groups to sulfonyl chloride groups.

*Example 5*

A copolymer of 78 percent by weight ar-vinyltoluene and 22 percent methyl methacrylate was sulfonated with sulfur trioxide while the reactants were dissolved in carbon tetrachloride. The polymer sulfonic acid formed at 2 percent by weight solution in water having a viscosity of 4 centipoises at 25° C. A slurry of the freshly prepared polymer sulfonic acid in carbon tetrachloride was treated with 2 molecular equivalents (based on the sulfonic acid groups) of thionyl chloride and boiled under reflux for 23 hours. The resulting copolymer sulfonyl chloride was soluble in tetrahydrofuran and in dimethylformamide.

*Example 6*

A copolymer of 96 percent by weight ar-vinyltoluene and 4 percent acrylonitrile (which copolymer formed a solution in nine times its weight of toluene having a viscosity of 25.6 centipoises at 25° C.) was sulfonated with sulfur trioxide while the reactants were dissolved in carbon tetrachloride. The resulting polymer sulfonic acid formed a 2 percent by weight solution in water having a viscosity of 21 centipoises at 25° C. A slurry of the freshly prepared polymer sulfonic acid in carbon tetrachloride was treated with 2 molecular equivalents of thionyl chloride (based on the sulfonic acid groups in the polymer) and the mixture was boiled under reflux for 23 hours. The swollen granules of copolymer sulfonyl chloride were filtered from the liquid medium and dried free of carbon tetrachloride, washed thoroughly with water and dried. The copolymer sulfonyl chloride was insoluble in water and insoluble in both tetrahydrofuran and in dimethyl formamide and had these elemental analyses by weight:

| | Percent |
|---|---|
| Sulfur | 15.43 |
| Chlorine | 12.52 |

These analyses correspond to a conversion of about 73 percent of the sulfonic acid groups to sulfonyl chloride groups.

*Example 7*

This example illustrates the use of a polymeric monoalkenylaromatic polysulfonyl chloride for preparation of a polymeric monoalkenylaromatic polysulfonamide.

A solution was prepared containing 1.3 grams of the dry polystyrene polysulfonyl chloride product obtained in Example 1 in one liter of tetrahydrofuran. At a temperature of 27° C., a stream of anhydrous ammonia gas was bubbled into the solution with agitation. The temperature rose to about 30° C. After one hour, the flow of ammonia was stopped. The precipitated solid was filtered from the reaction mixture, dried at 50° C., ground to a powder, washed with water and dried. There was obtained 1.2 grams of a tan pulverulent polystyrene polysulfonamide that contained, by analysis, 6.53% by weight nitrogen and less than 0.2% chlorine.

In like manner, other polymeric monoalkenylaromatic polysulfonamides can be made from polymeric monoalkenylaromatic polysulfonyl chlorides by reaction with ammonia or primary or secondary amines.

I claim:

1. A method for the preparation of a resin polysulfonyl chloride from a sulfonated resinous polymer in which resinous polymer the polymerically combined monomer units consist essentially of (a) a monovinylaromatic hydrocarbon and (b) from 0 to 4 percent by weight of acrylonitrile based on the resinous polymer, which method comprises suspending the sulfonated resinous polymer in carbon tetrachloride, adding thereto at least 1.5 molecular proportions of thionyl chloride for each equivalent of sulfonic acid group in the sulfonated resinous polymer, the proportion of carbon tetrachloride being at least 80 percent by weight of the whole mixture, and maintaining the resulting mixture at a reaction temperature between 25° C. and the boiling point of the mixture until at least 70 percent of the sulfonic acid groups in the sulfonated resinous polymer have been converted to sulfonyl chloride groups.

2. A method according to claim 1 wherein the starting sulfonated resinous polymer is water-soluble and contains an average of at least 0.6 sulfonic acid group per unit of monovinylaromatic hydrocarbon in the polymer.

3. A method according to claim 1 wherein the starting sulfonated resinous polymer is a water-soluble sulfonated homopolymer of styrene containing an average of at least 0.6 sulfonic acid group per unit of styrene in the polymer.

4. A method according to claim 1 wherein the starting sulfonated resinous polymer is a water-soluble sulfonated polymer consisting essentially of polymerically combined units of ar-methylstyrene containing an average of at least 0.6 sulfonic acid group per unit of the ar-methylstyrene in the polymer.

References Cited in the file of this patent

UNITED STATES PATENTS

| | | |
|---|---|---|
| 2,616,917 | Coover | Nov. 4, 1952 |
| 2,725,368 | Reynolds | Nov. 29, 1955 |
| 2,778,813 | Gaspar | Jan. 22, 1957 |

OTHER REFERENCES

Whitmore: "Organic Chemistry," Van Nostrand (1937), pages 772, 773.